United States Patent
Eisenhaure et al.

[11] Patent Number: 5,969,446
[45] Date of Patent: Oct. 19, 1999

[54] FLYWHEEL PERMANENT MAGNET MACHINE

[75] Inventors: David B. Eisenhaure, Cohasset; Richard L. Hockney, Lynnfield; Gary Colello, Lunenberg, all of Mass.; Vijay Gondhalekar, New York, N.Y.; Gita P. Rao, Belmont, Mass.

[73] Assignee: Satcon Technology Corporation, Cambridge, Mass.

[21] Appl. No.: 09/048,704

[22] Filed: Mar. 26, 1998

[51] Int. Cl.⁶ .............................. H02K 7/02; H02K 5/24
[52] U.S. Cl. .................... 310/74; 310/51; 310/91
[58] Field of Search .................... 310/51, 52, 54, 310/58, 59, 60 R, 60 A, 67 R, 74, 156, 89, 91, 254; 74/572, 573 R, 574

[56] References Cited

U.S. PATENT DOCUMENTS

| | | | |
|---|---|---|---|
| 4,412,170 | 10/1983 | Roesel, Jr. | 310/74 |
| 4,998,032 | 3/1991 | Burgbacher | 310/51 |
| 5,019,737 | 5/1991 | Bruno | 310/89 |
| 5,065,060 | 11/1991 | Takahashi et al. | 310/74 |
| 5,298,827 | 3/1994 | Sugiyama | 310/156 |
| 5,448,118 | 9/1995 | Nakamura et al. | 310/54 |
| 5,616,973 | 4/1997 | Khazanov et al. | 310/54 |
| 5,721,459 | 2/1998 | Rao et al. | 310/74 |
| 5,744,880 | 4/1998 | Kudoh et al. | 310/58 |
| 5,747,900 | 5/1998 | Nakamura et al. | 310/58 |

*Primary Examiner*—Thomas M. Dougherty
*Assistant Examiner*—Tran N Nguyen
*Attorney, Agent, or Firm*—Dike, Bronstein, Roberts & Cushman, LLP; George W. Neuner

[57] ABSTRACT

A flywheel energy storage device has a central shaft, a flywheel having a flywheel rotor supported by and mounted for rotation around said shaft, and a motor/generator having a stator and a rotor. The rotor is formed integrally with the flywheel rotor. The stator has an outer cylinder that is cooled by a liquid flowing in contact with its cylindrical surface. Preferably, the stator has (i) a cylindrical hub having an outer surface and longitudinal channels formed therein, (ii) a cylinder surrounding said cylindrical hub thereby providing passages through the channels, and (iii) end caps sealing the passages and providing a distribution channel for distributing fluid to said passages, thereby providing fluid cooling passages for said stator. A radial vibration dampener can be positioned at one or both ends of the shaft. The dampener has a plurality of spring members positioned between two cylindrical surfaces, one end of each spring member being attached to each cylindrical surface.

8 Claims, 5 Drawing Sheets

FLYWHEEL PERMANENT MAGNET MACHINE

FIELD OF THE INVENTION

The present invention relates generally to a flywheel energy storage system and, more particularly, to a system including a motor/generator, which can be used as a power supply, for example, in a motor vehicle.

BACKGROUND

Prior art flywheel energy storage systems have been designed primarily for stationary use, due to their bulk and their vulnerability to vibration.

Known mobile systems for storing electrical energy, such as batteries, have had high mass and limited capacity. However, for motor vehicle applications, where acceleration calls for substantial energy inputs, and recuperative braking can generate comparably large amounts of energy to be stored, it would be desirable to have a relatively low-mass, high-storage-capacity system adapted for mobile use. A suitably designed flywheel system could satisfy these needs.

Also, the telephone industry has long used lead acid batteries for back-up power to provide uninterruptible service. The typical telephone network sends signals over optical fiber from the central office to a remote terminal. Each remote terminal supports approximately 1000 homes. The cable companies use a similar configuration, where signals are sent from the "head end" (cable company office) to remote terminals servicing approximately 500 homes. In both cases the remote terminal uses power provided by the local utility to carry the signal from the terminal to the subscriber, since fiber optic cable cannot carry electricity. To support the terminal during a utility outage, the phone or cable companies install a back-up power supply, typically an uninterruptible power supply that uses batteries as a power source.

It is desirable to eliminate batteries from these networks because of their limited life, poor reliability, and high maintenance requirements. One replacement for batteries is the flywheel energy storage system.

U.S. Pat. No. 4,211,452 describes an inertia wheel more particularly adapted to space applications. It includes the combination of a peripheral type of motor with permanent magnet on the rotor and ironless winding on the stator. This structure limits speed due to stress. The current of the winding is switched electronically by an amplitude modulation system, associated to a reactance coefficient varying circuit, and reversal of direction of rotation of which is achieved by permutation of the control circuits. There are also provided bearings formed by a passive radial magnetic centering device and a redundant active axial magnetic centering device slaved to an axial rate detector. This device requires a permanent magnet and four control coils just for axial control.

U.S. Pat. No. 4,620,752 describes a magnetic bearing having position stabilization of a supported body which includes damping and aligning arrangement. An application of the magnetic bearing is illustrated showing a magnetic bearing system for a flywheel. This system requires combining two control coils with two rotating permanent magnets for each bearing.

It can be appreciated that new and improved flywheel systems are desired, in particular, for mobile use and for back-up power supply systems to provide uninterruptible power supplies.

SUMMARY OF THE INVENTION

The flywheel system of the present invention provides an improved energy storage system comprising a flywheel and a motor/generator contained in a housing. A rotor is attached to a hub that is mounted on a vertical shaft within the housing. The rotor comprises both the flywheel rotor and the rotor of a permanent magnet motor/generator. Within the rotor of the permanent magnet motor/generator is the stator of the motor/generator. Preferable, the stator is cooled by a continuous flow of a cooling fluid.

In a preferred embodiment, a radial dampening device is positioned at one or, more preferably, both ends of the shaft. One radial dampening device comprises a plurality of spring members positioned an annular space between two cylindrical surfaces, the inner cylindrical surface being attached to the shaft and the outer surface being attached directly or indirectly to the housing.

The permanent magnetic motor/generator draws power to spin-up the flywheel rotor to its steady state speed, transforming electrical energy into kinetic energy. The flywheel remains at its steady state rotational speed, drawing a nominal load. When power is required, the motor/generator transitions from a motor to a generator drawing energy from the flywheel for delivery.

When the flywheel is mounted in a vehicle, the flywheel-and-housing module preferably is mounted on a one-degree-of-freedom gimbal, which permits the spin axis to rotate through 30 degrees. That reduces the loading on the bearings during vehicle maneuvering.

In a preferred embodiment of the invention, the amount of energy that can be stored is increased by running the flywheel at up to 54,000 RPM. As a result, the flywheel can store 4.25 kilowatt-hours (kW-hrs). It is not desirable to run a flywheel down to a stop, so the operating speed range typically is between 54,000 RPM and 27,000 RPM, i.e., a 2:1 operating range. The efficiency of conversion of a flywheel's kinetic energy into electricity is not 100%, but rather about 90%. To avoid air resistance, the flywheel is surrounded by an airtight housing, which is evacuated, preferably to about 100 milliTorr.

BRIEF FIGURE DESCRIPTION

DETAILED DESCRIPTION OF THE INVENTION

Figure 1:
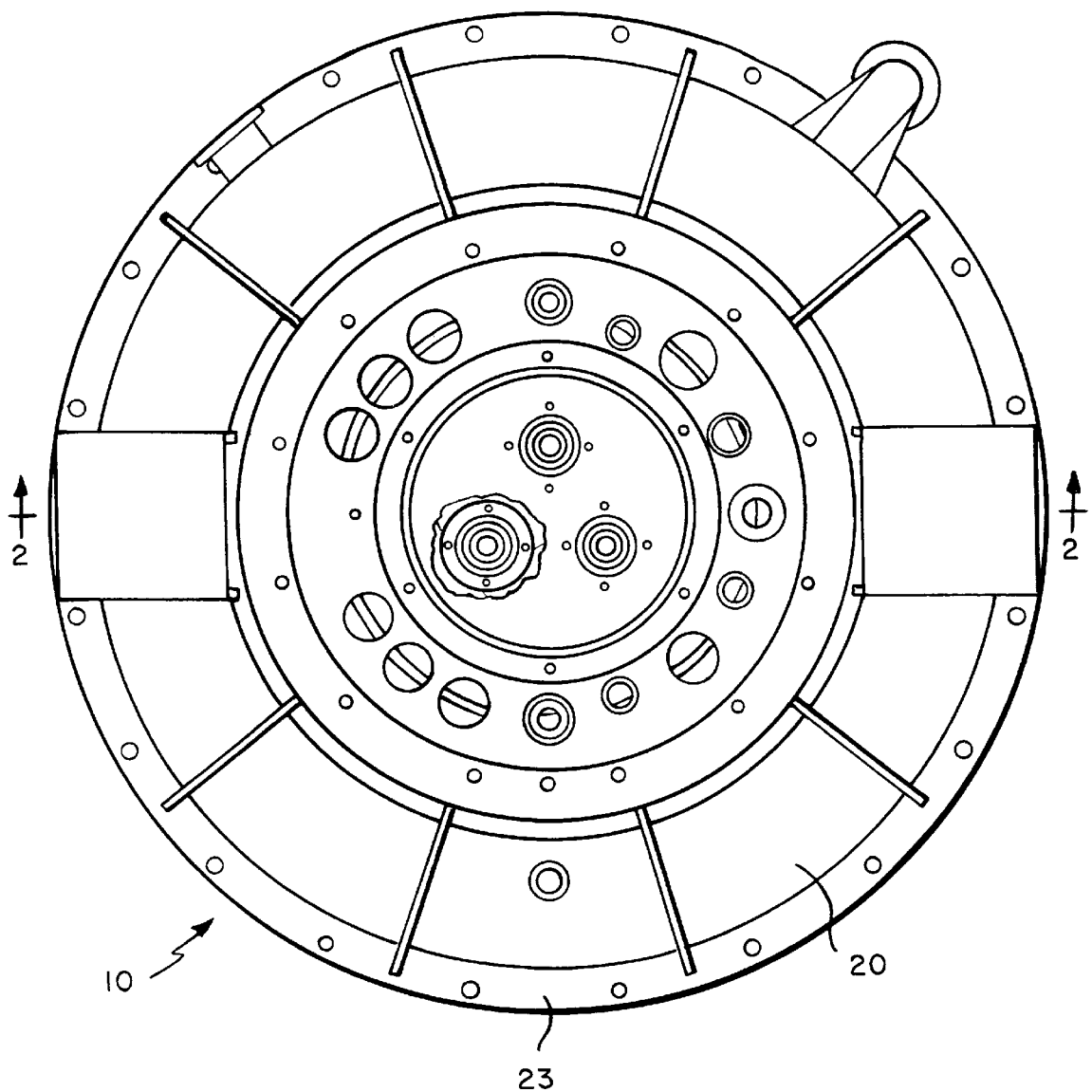
FIG. 1 is a plan view of a flywheel energy storage device in accord with a preferred embodiment of the present invention.

As illustrated in the drawings, one embodiment of a flywheel energy storage device 10 in accord with the present invention comprises a housing 20 containing a flywheel 30 and a motor/generator 50.

Figure 2:
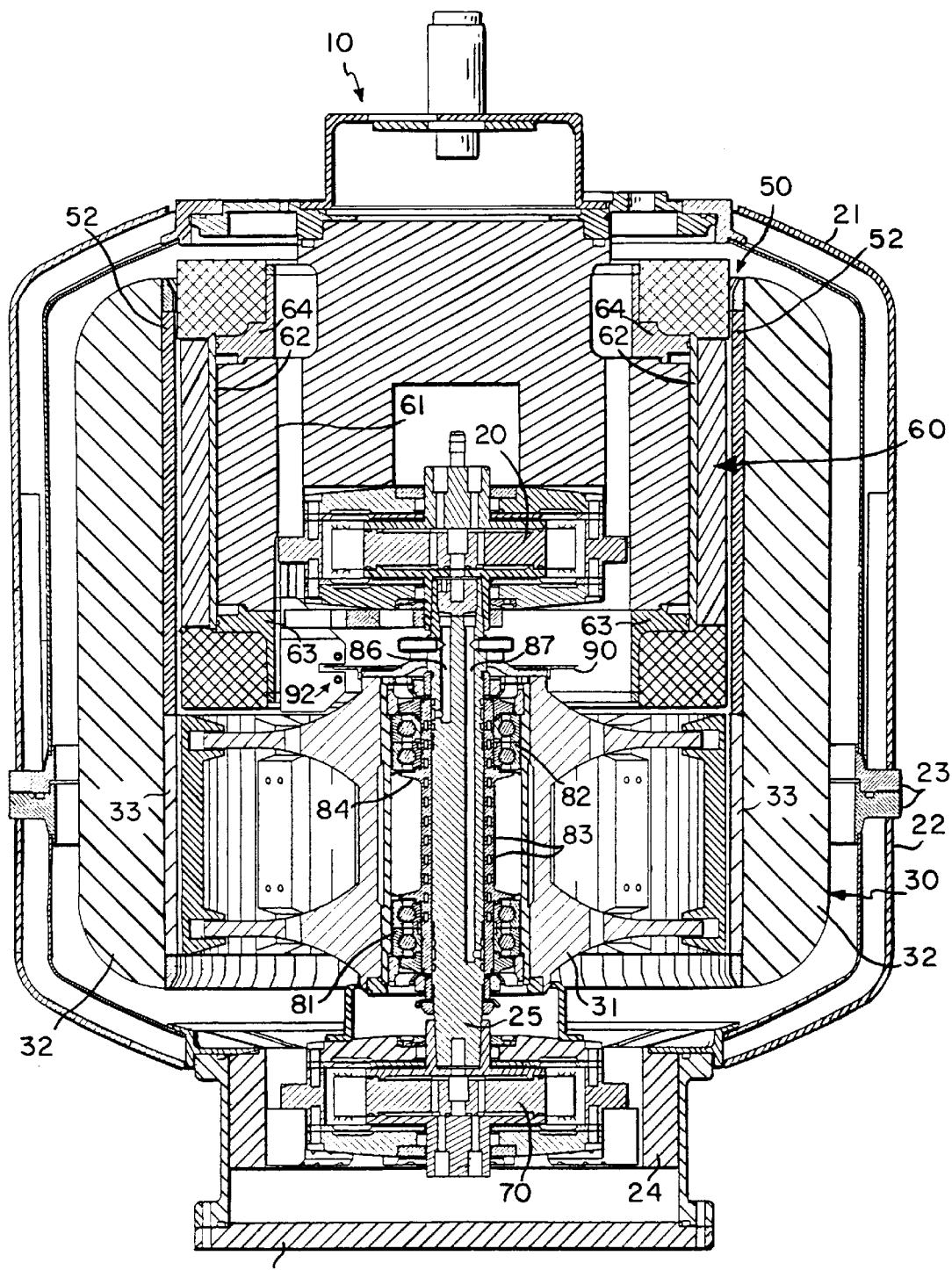
FIG. 2 is a cross-sectional view of the flywheel energy storage device along line 2—2 of FIG. 1.

As shown in FIG. 2, the energy storage device 10 of the present invention includes an upper housing 21 and a lower housing 22, which are joined by circumferential flanges 23 secured together by a plurality of bolts (not shown). Inside the housing is a center shaft 25 on which the flywheel 30 is mounted on a hub 31. A motor/generator 50 is located within the housing above the hub.

The flywheel rotor 32 is attached to the hub 31 and extends vertically to surround the stator 60 of the motor/generator to provide the rotor for the motor/generator. An array consisting of a plurality of permanent magnet pieces 52 is attached to the inside of the rotor 32 opposite to the stator, which is separated from the rotor by a small gap. The magnets 52 are radially magnetized with adjacent magnets having opposite polarity. The magnet pieces preferable are arcuately shaped to match the curvature of the rotor. Preferably, the magnets are made of a flexible neodymium-iron-boron magnet material such as sold by The Electrodyne Company, Inc. of Batavia, Ohio. However, any suitable magnet material can be used. Preferably, the magnets flex upon spinning of the flywheel to follow the shape of the composite rotor.

Below the permanent magnets on the inside of the rotor are spacers 33. The spacers are conveniently made from a non-magnetic material having about the same density as the magnets 52. Preferably, a stainless steel laminate is used for the spacers to provide the same bore mass as the magnets. Thus, the magnets and the spacers bore load the flywheel rotor to facilitate making the flywheel rotor from hoop wound fiber and to keep the rotor from suffering tensile failure during operation. Preferably, the flywheel rotor is made of a composite material consisting of glass or carbon fibers in an epoxy resin.

Figure 6:
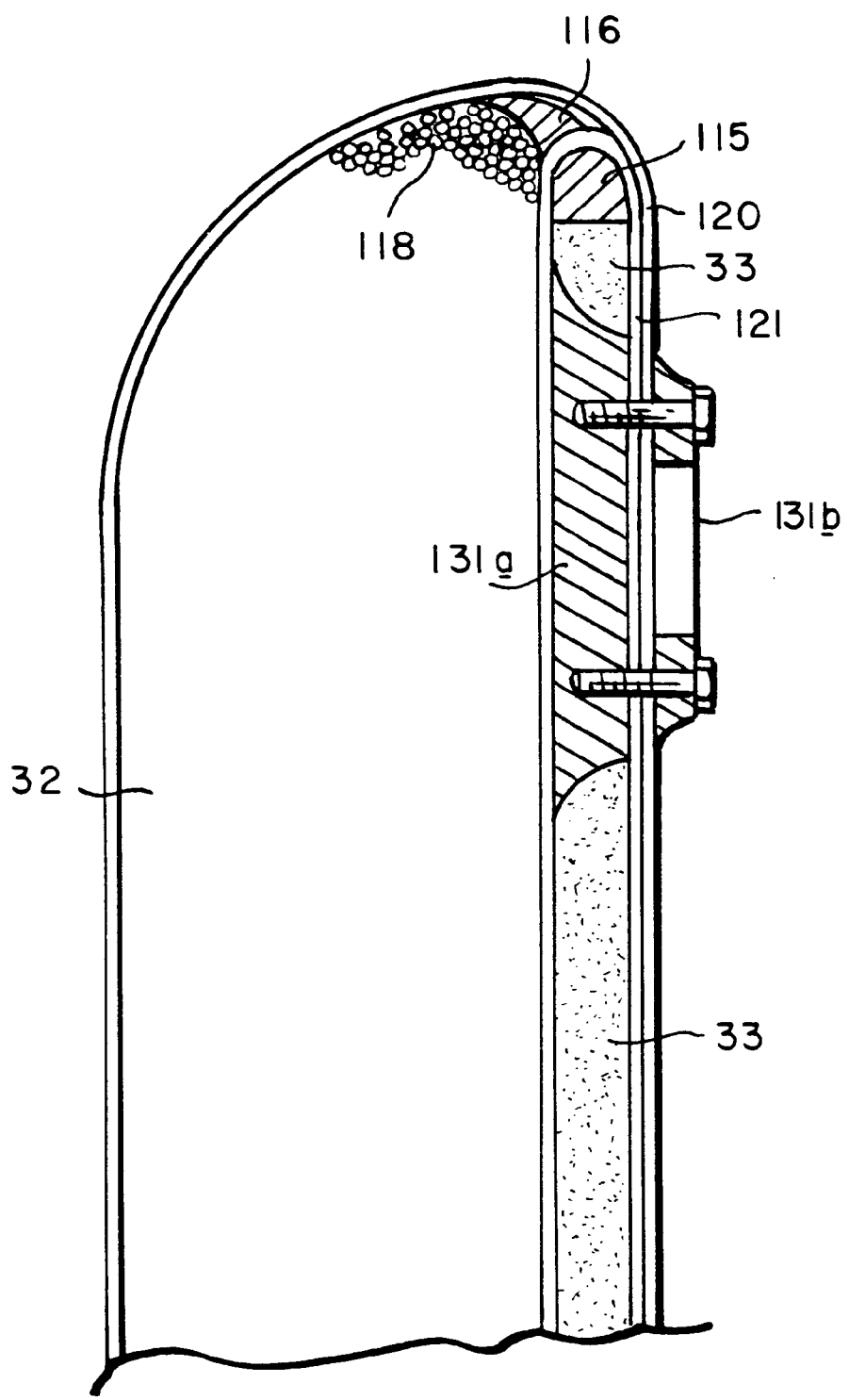
FIG. 6 is an enlarged detail illustration of an alternative embodiment of a flywheel rotor end of the present invention. of a shaft and bearing jacket useful for a flywheel energy storage device in accord with the present invention.

An enlarged illustration of an alternative embodiment of a flywheel rotor end detail is illustrated in FIG. 6. The end of rotor 32 is shaped by the winding of the carbon fibers 118. A two part hub pocket 131a, 131b is used to attach the flywheel rotor 32 to hub 31 (see FIG. 2) to permit components to be overwrapped with a carbon fiber cloth. Hub anchor 131a is designed having the same thickness as the magnets 52 and spacers 33, so that the assembly can be wrapped with a carbon fiber inner overwrap 121. In this embodiment a portion of the spacers 33 is located both above and below the hub anchor 131a. A tantalum closure ring 115 is provided at each end of the spacer/magnet assembly inside the inner overwrap 121. The rotor 32 and the spacer magnet assembly uses a deltoid filler block 116, made of a suitable material, to facilitate assembly, and is then enclosed with an outer overwrap 120. A hub pocket 131b, which receives an arm of hub 31, is mounted to each hub anchor 131a to correspond with each arm of the hub 31.

In accord with a preferred embodiment of the present invention, a "Toray" carbon fiber hollow cylindrical flywheel rotor is provided with magnets embedded on the inner surface. This structure permits the stator to be located inside the flywheel and provides efficient overall layout of the device. The location of the magnets provides advantages for accommodating stresses in the rotor when spinning because the magnets provide bore loading to the inner surface of the flywheel and, thus, minimize radial transverse to hoop fiber tensile stresses. The magnets are segmented to minimize hoop strain mismatch with the hoop wound carbon fibers. The ends of the flywheel are shaped as illustrated in FIG. 6 toto minimize transverse shear stresses in the composite laminate. The magnets and spacers are contained axially by closure rings, preferably made of tantalum. The carbon fiber overwraps are used to contain the multi component assembly structure. This structure permits operation at very high rotational speeds, up to at least about 58,000 rpm with sound structural integrity.

Figure 3:
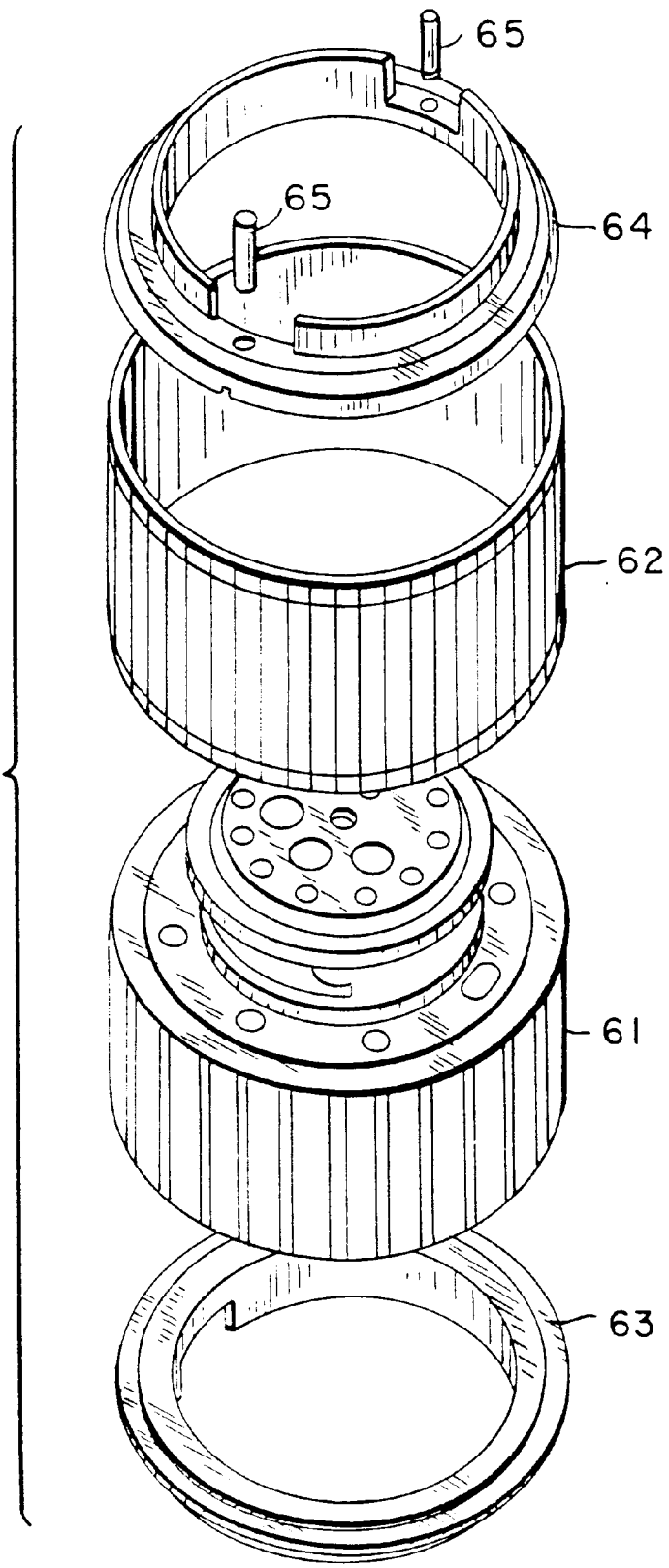
FIG. 3 is an exploded view of the stator assembly of the flywheel energy storage device illustrated in FIG. 2.

The stator 60 is assembled as illustrated in FIG. 3. The stator includes a ceramic hub 61 having vertical channels on its outside cylindrical surface. Around the hub 61 is fitted a ceramic cylinder 62, thereby creating vertical passages between the hub and the cylinder, through which liquid coolant can flow. The outside cylindrical surface of the cylinder also contains vertical channels on which the stator coils are wound. The coils are compacted Litz bundles, as described more detail in U.S. Pat. No. 4,439,256 (Meserve).

Ceramic end caps 63 and 64 seal the coolant passages and provide for distribution channels to distribute the coolant to each of the passages. Fluid inlet and outlet tubes 65 are provided on the upper end cap 64. On the underside of the upper end cap 64, located about halfway between the tubes 65, are two dams positioned to prevent coolant from flowing directly from the inlet tube to the outlet tube without flowing through the vertical channel passages of the stator. Thus, the fluid enters through one tube 65, is distributed around one half of the stator, flows down the channel passages between the hub and the cylinder on one half of the stator flows through the distribution channel provided by the lower end cap to the other side of the stator where the fluid flows up the vertical channel passages to the upper end cap where it is directed to the exit tube.

The center shaft 25 is stationery with the flywheel hub 31 mounted on the shaft by bearings 81, 82, which permit rotation of the flywheel 30 around the shaft. On either end of the shaft are radial dampeners 70 that dampen radial vibrations of the shaft caused by the rotating flywheel 30.

Figure 4:
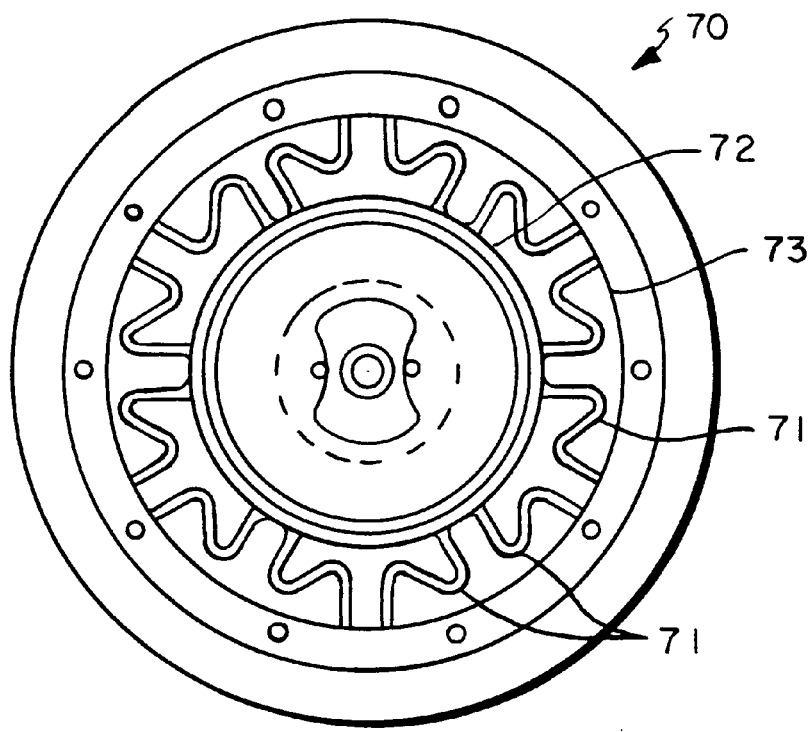
FIG. 4 is a plan view of the radial vibration dampener for the flywheel energy storage device illustrated in FIG. 2.

As illustrated in FIG. 4, the dampener 70 has a plurality of spring members 71 between an inner cylinder 72 and an outer cylinder 73. One end of each spring 71 is attached to each cylinder. This device preferably provides radial vibration dampening at each end of the shaft.

Figure 5:
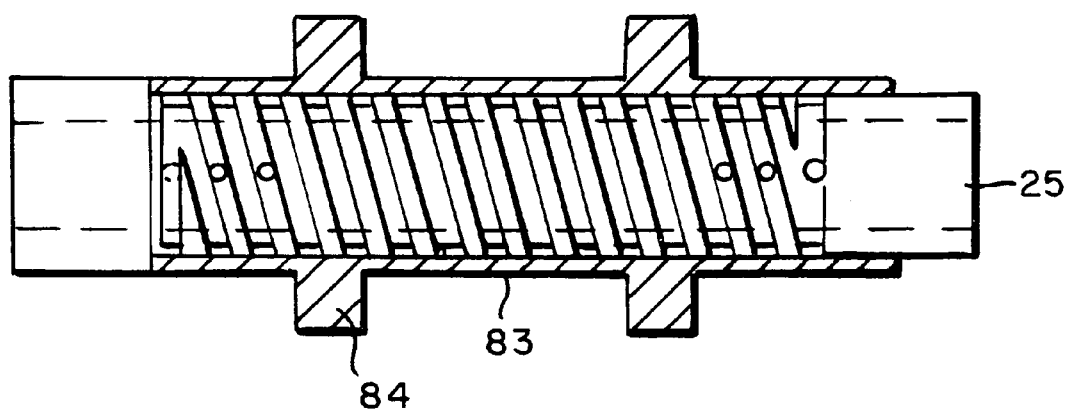
FIG. 5 is an elevational view, partly in cross section, of one embodiment

The shaft preferably contains a spiral channel 83 located between the shaft and a bearing jacket 84, on which the bearings are mounted (see FIG. 5). A lubricating/cooling fluid can be pumped through the channel using inlet bore 86 and outlet bore 87 located in the shaft. Openings are positioned in the bearing jacket at the location of the bearings to provide passage of the fluid to lubricate the ball bearings.

In assembly, the upper radial dampener 70 is mounted and positioned within a center opening in the stator hub 61. The shaft 25 is positioned directly under the upper dampener and attached thereto by a center pin. The lower radial dampener 70 is positioned directly under the lower end of the shaft and also attached thereto by a center pin. The lower dampener is centered within the housing 22 with a locator ring 24, which sits on the base plate 26. The components are held together by the housing and base plate by interference fitting with suitably positioned o-rings. Openings are provided through the top of the housing (see FIG. 1) for power connections, for supply of cooling and lubricating fluid, and for sensors.

The system includes a rotatable encoder disk 90 and an optical sensor 92, which provides a rotational position signal to a circuit that supplies commutation signals when the device is being operated as a motor.

The invention has been described in detail with reference to preferred embodiments thereof. However, it will be appreciated that, upon consideration of the present specification and drawings, those skilled in the art may make modifications and improvements within the spirit and scope of this invention as defined by the claims.

What is claimed is:

1. A flywheel energy storage device comprising a sealed housing containing:
   a central shaft;
   a flywheel having a flywheel rotor supported by and mounted for rotation around said shaft; and
   a motor/generator having a stator and a motor rotor, the motor rotor being formed integrally with said flywheel rotor;
   wherein the stator comprises (i) a cylindrical hub having an outer surface and longitudinal channels formed therein, (ii) a cylinder surrounding said cylindrical hub thereby providing passages through the channels, and (iii) end caps sealing the passages and providing a distribution channel for distributing fluid to said passages, thereby providing fluid cooling passages for said stator; and
   wherein said rotor of the motor/generator is formed by positioning permanent magnet pieces in an array around an inner cylindrical surface of the rotor and separated from the stator by a gap, the permanent magnet pieces being magnetized radially with adjacent magnet pieces having opposite polarity,
   further comprising a radial vibration dampener positioned at one end of the shaft, said dampener comprising a plurality of spring members positioned between two cylindrical surfaces, one end of each spring member being attached to each cylindrical surface.

2. The flywheel energy storage device of claim 1, wherein the cylinder of the stator is cooled by a liquid flowing in contact with a cylindrical surface thereof.

3. The flywheel energy storage device of claim 1, wherein the flywheel rotor is bore loaded.

4. A flywheel energy storage device comprising a sealed housing containing:
   a central shaft;
   a flywheel having a flywheel rotor supported by and mounted for rotation around said shaft; and
   a motor/generator having a stator and a motor rotor, the motor rotor being formed integrally with said flywheel rotor,
   further comprising a radial vibration dampener positioned at one end of the shaft, said dampener comprising a plurality of spring members positioned between two cylindrical surfaces, one end of each spring member being attached to each cylindrical surface.

5. The flywheel energy storage device of claim 4, wherein the stator comprises an outer cylinder that is cooled by a liquid flowing in contact with a cylindrical surface thereof.

6. The flywheel energy storage device of claim 4, wherein the stator comprises (i) a cylindrical hub having an outer surface and longitudinal channels formed therein, (ii) a cylinder surrounding said cylindrical hub thereby providing passages through the channels, and (iii) end caps sealing the passages and providing a distribution channel for distributing fluid to said passages, thereby providing fluid cooling passages for said stator.

7. The flywheel energy storage device of claim 4, wherein said rotor of the motor/generator is formed by positioning permanent magnet pieces in an array around an inner cylindrical surface of the rotor and separated from the stator by a gap, the permanent magnet pieces being magnetized radially with adjacent magnet pieces having opposite polarity.

8. The flywheel energy storage device of claim 4, wherein the flywheel rotor is bore loaded.

* * * * *